United States Patent [19]

Murphy

[11] 4,021,853
[45] May 3, 1977

[54] METHOD AND APPARATUS FOR THE MAGNETIC STORAGE OF DIGITAL DATA
[75] Inventor: John V. Murphy, Norristown, Pa.
[73] Assignee: Sperry Rand Corporation, New York, N.Y.
[22] Filed: Mar. 30, 1976
[21] Appl. No.: 671,810
[52] U.S. Cl. .................................. 360/44; 360/45
[51] Int. Cl.² ....................................... G11B 5/09
[58] Field of Search .................. 360/44, 45, 46, 40
[56] References Cited
UNITED STATES PATENTS

| | | | |
|---|---|---|---|
| 3,235,855 | 2/1966 | Woo | 360/43 |
| 3,827,078 | 7/1974 | Bauer | 360/45 |
| 3,879,342 | 4/1975 | Patel | 360/45 |

Primary Examiner—Vincent P. Canney
Attorney, Agent, or Firm—Frank Thompson; Eugene T. Battjer

[57] ABSTRACT

An improved method and apparatus for the storage of binary data on a magnetic surface is described. The binary data to be stored is provided in the form of electrical pulses occurring sequentially at intervals of time T. The method and apparatus provide for exciting a recording head and causing a flux transition at a first predetermined time $T_1$ during the data pulse interval in order to store a first binary character or, alternatively, for exciting the head at a second predetermined time $T_2$ for storing a second binary character. A minimum transition separation time $T_{min}$ equal to the interval period T is established by inhibiting excitation of the head at those times which are separated from another transition by a period of time less than T. A limited maximum transition separation time $T_{max}$ is provided by shifting the excitation of the head in an interval immediately adjacent an interval during which excitation of the head was inhibited.

17 Claims, 7 Drawing Figures

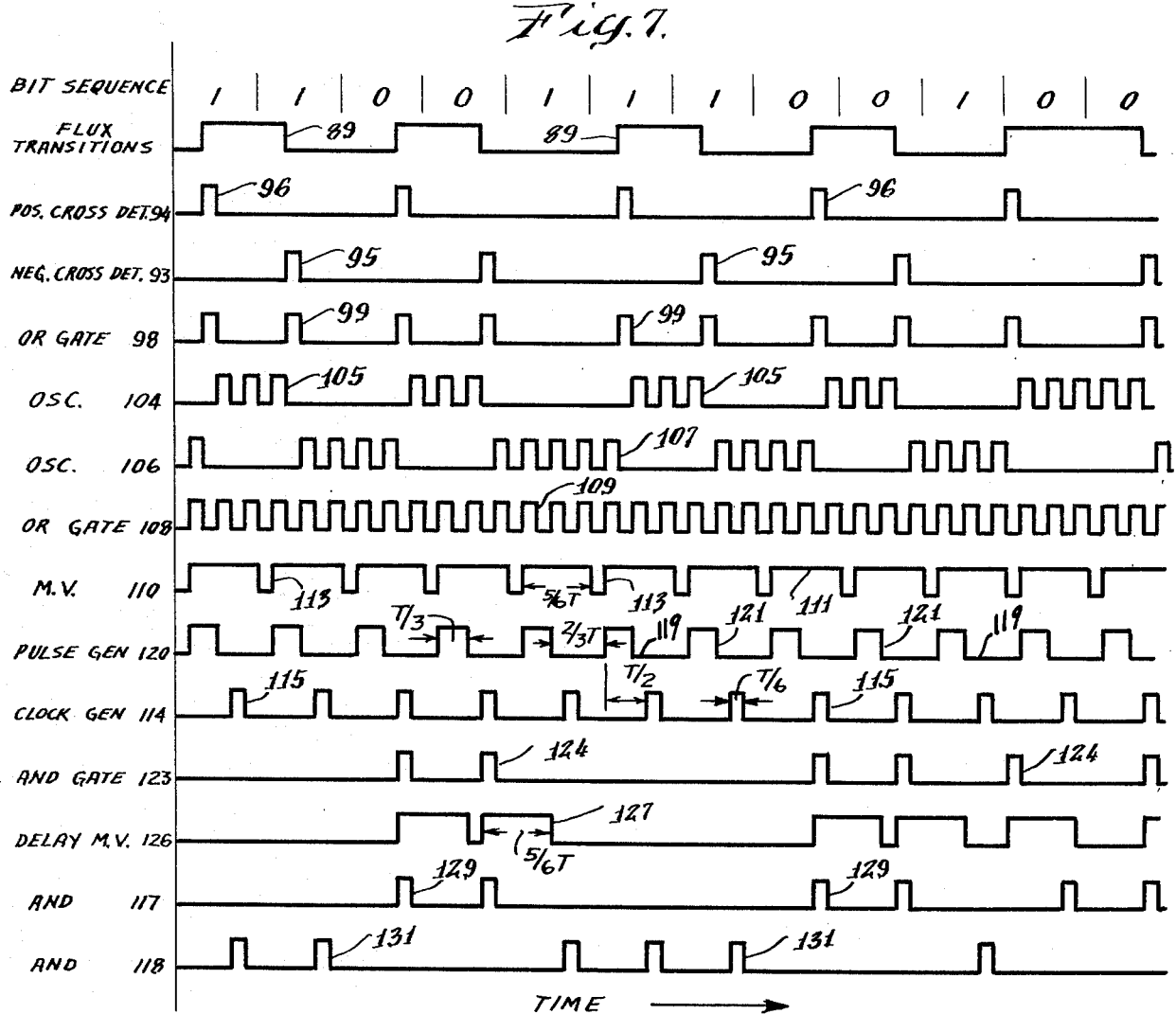
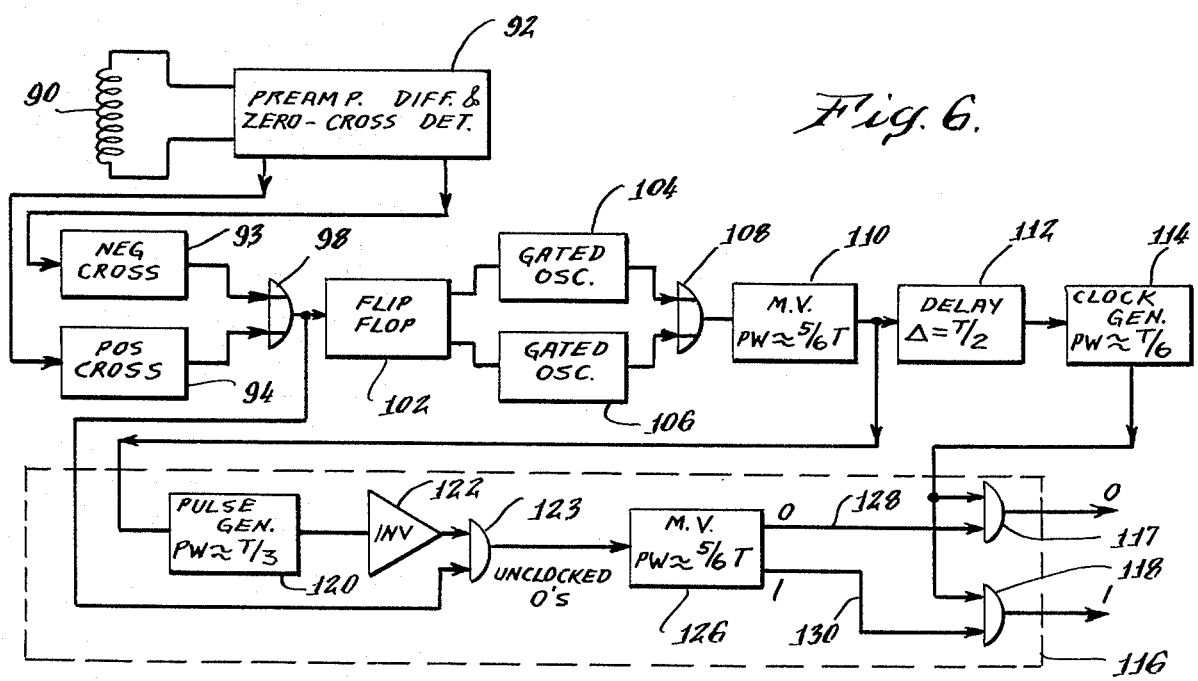

METHOD AND APPARATUS FOR THE MAGNETIC STORAGE OF DIGITAL DATA

BACKGROUND OF THE INVENTION

This invention relates to an improved method and apparatus for the storage of digital data on a magnetic surface. The invention relates more particularly to an improved method and apparatus for encoding the stored digital data in order to enhance its storage and recovery.

Various high capacity magnetic storage techniques are known for storing data occurring in the form of digital electrical signals. Among these techniques, and with which this invention is concerned, is the storage of digital data on a magnetic surface such as is provided by a magnetic tape, disc or drum. In these arrangements, an elongated track of magnetic material is transported past a station at which location a residual magnetic pattern corresponding to a pattern of bits of binary information being stored is formed on the track.

An important consideration in the storage of data in this manner is the packing density of the bits of stored data. The storage capacity, physical size and cost of a system is dependent to a large extent upon the density per unit length of track with which binary bits are stored on the magnetic medium. A single bit of binary information is stored in a cell which comprises a storage area extending along the length of the track. A longitudinal array of the cells is formed on the track and bits are stored in cells as transitions of residual flux. While providing a relatively short separation time ($T_{min}$) between transitions reduces cell size and increases the packing density, other considerations impose restrictions on the bit density. These considerations include the capability of a recording/readout means to reliably form the transitions during storage and to distinguish between the relatively closely spaced transitions during readout.

Various techniques for encoding the binary information being stored have been employed in order to enhance detection and recovery of the data and thus to increase the bit packing density. In a phase modulation [PM] techique, a positive flux transition is centered in a data cell when a first binary character such as a binary 1 is being stored and, alternatively, a negative flux transition is centered in the data cell when storing a second binary character such as a binary 0. A frequency modulation [FM] technique provides for two flux transitions in a cell when storing a binary character 1 and a single flux transition for storing a binary character 0. In a modification of this frequency modulation technique, one binary character is represented by a flux transition in the center of a cell while the second binary character is stored as a flux transition at a cell boundary. A further modification is provided in the latter [MFM] coding technique by inhibiting a transition when the first and second binary characters occur in predetermined sequences in immediately adjacent cells. More particularly, in one modified frequency modulation technique, also known as the "look back" technique, a transition at a cell boundary representing the second binary character is inhibited when it succeeds the first binary character in an adjacent cell. In another modified frequency modulation technique known as the "look ahead" technique, a transition representing the second binary character is inhibited when it preceeds the first character in an adjacent cell.

The bit packing density provided by these encoding techniques as well as prior techniques is affected in large part by the interval of minimum separation ($T_{min}$) existing between flux transitions. Maximum separation on the other hand is significant in determining the bandpass of the system, the self clocking characteristic of the system and the susceptibility of the system to speed variations occurring in a traveling magnetic track. The recording of binary data on a magnetic track and particularly on magnetic tape is characterized by a severely limited bandpass. It is therefore desirable that the encoding technique employed to enhance packing density provide efficient bandwidth usage in order to be compatible with a restricted recording bandpass. The bandpass for binary data encoded as flux transitions is a function of the ratio of maximum transition separation to minimum transition separation: BW is proportional to $T_{max}/T_{min}$. The provision of a relatively short $T_{min}$ increases packing density. A relatively long $T_{max}$ however reduces inherent self clocking capabitities of the storage system and increases the susceptibility of the system to variations in the speed of a traveling magnetic track.

Although the encoding techniques referred to hereinbefore enhance detection and recovery of data thereby providing for improved packing density, it is desirable to provide binary data encoding of relatively reduced maximum transition time $T_{max}$.

Accordingly, it is an object of this invention to provide an improved method and apparatus for storing digital data on a magnetic surface.

Another object of the invention is to provide an improved method and apparatus for encoding binary data for storage on a magnetic surface.

A further object of the invention is to provide an encoding method and apparatus having a relatively reduced maximum transition time $T_{max}$.

Still another object of the invention is to provide an improved encoding method and apparatus useful in both look ahead and look back recording techniques.

SUMMARY OF THE INVENTION

In accordance with the present invention, an improved method for storing data in a digital data storage system wherein bits of binary data to be stored are applied to the system as electrical pulses at intervals of time T and wherein the system includes a magnetic surface storage medium for sequentially storing bits as residual magnetic flux on a longitudinally extending track of the medium comprises the steps of establishing relative motion between the track and a recording head and exciting the recording head for causing a single flux transition to occur in the magnetic state of a segment of the track during a data pulse interval T. The transition occurs during the data pulse interval at a first predetermined time $T_1$ for storing a bit representative of a first binary character or, alternatively, at a second predetermined time $T_2$ during the data pulse interval for storing a bit representative of a second binary character. A minimum transition time $T_{min}$ between transitions is established at a value substantially equal to T by inhibiting excitation of the head at a time which is spaced from a transition in an immediately adjacent interval by a period of time less than T. The maximum transition time $I_{max}$ is limited to less than 2T by shifting excitation of the head from a predetermined time in an interval which is immediately adjacent an interval during which excitation of the head was inhibited.

In a particular embodiment of the method of the invention, binary data pulses occur at the initiation $T_0$ of each data pulse interval T and the head is excited at times $T_1$ and $T_2$ which occur substantially at times ⅓ T and ⅔ T respectively after initiation of a data pulse interval. The minimum separation $T_{min}$ between transitions is established at a value equal to T by inhibiting excitation of the head at a time $T_1$ which is spaced from a transition at a time $T_2$ in an immediately adjacent interval, as for example, in a preceeding interval. A maximum transition separation $T_{max}$ substantially equal to 5/3 T is established by shifting excitation of the head from time $T_2$ to $T_0$ in an interval which is immediately adjacent an interval during which excitation of the head was inhibited such as in an immediately preceeding interval.

In accordance with features of the apparatus of the present invention, there is provided a recording head adapted to generate a magnetic field when excited, a magnetic surface storage medium having a longitudinally extending track thereon, a means for establishing relative motion between the track and the recording head, and a means for exciting the recording head for causing a single flux transition in a segment of the track to occur during a data pulse interval T at a first predetermined time $T_1$ for storing a first binary character or, alternatively, at a second predetermined time $T_2$ for storing a second binary character. Means are provided for inhibiting the excitation of the head during an interval at a time which is spaced from a transition in an immediately adjacent interval by a period of time less than T. Means are also provided for shifting excitation of the head in an interval which is immediately adjacent an interval during which excitation of the head was inhibited.

In accordance with one embodiment of the apparatus of the invention binary data pulses occur at the initiation $T_0$ of each data pulse interval and means are provided for causing head excitations to alternatively occur substantially at times ⅓, T and ⅔ T after initiation of the data pulse interval. Means for inhibiting excitation of the head are adapted for inhibiting excitation at a time $T_1$ which is spaced from a transition at time $T_2$ in an immediately adjacent interval as, for example, in a preceeding interval. Additional means operate to shift excitation of the head from the time $T_2$ to time $T_0$ in an interval immediately adjacent an interval during which the head was inhibited, such as in a preceeding interval, thereby establishing a maximum transition separation time of 5/3 T.

The method and apparatus of the invention are particularly advantageous since the establishment of a minimum transition period $T_{min}$ substantially equal to T provides for a relatively dense packing of data bits while advancing the occurrence of a character in a cell immediately following an inhibited character provides for a relatively reduced maximum separation $T_{max}$. The bandwidth of the system is thereby substantially reduced, the inherent self clocking characteristics of the system are enhanced and the susceptibility of the system to variations in the speed of the track of the magnetic medium is reduced.

DESCRIPTION OF THE DRAWINGS

These and other objects and features of the invention will become apparent with reference to the following specification and to the drawings wherein:

FIG. 6 is a diagram, partly schematic and partly in block form, illustrating an apparatus for recovering data stored on magnetic tape by the arrangement of FIG. 1; and, FIG. 7 is a diagram illustrating signal waveforms occurring at different locations in the circuit arrangement of FIG. 6.

DETAILED DESCRIPTION

Figure 1:
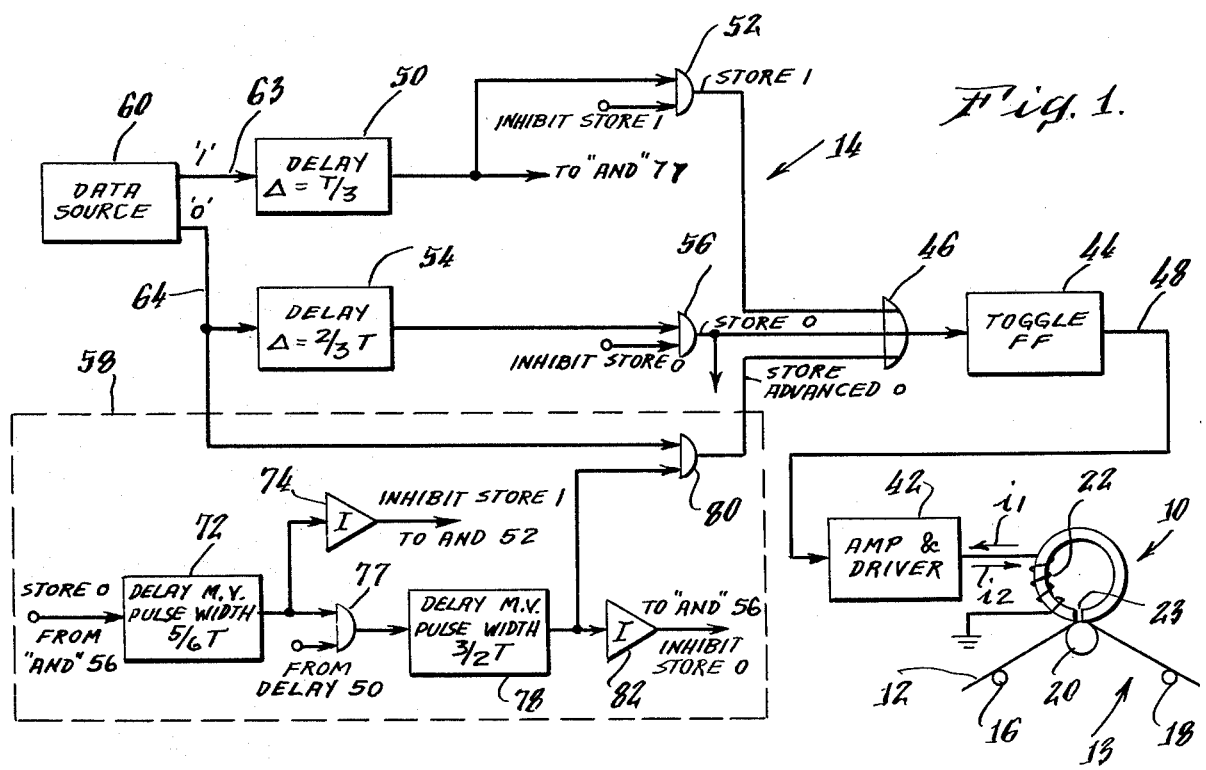
FIG. 1 is a diagram, partly schematic and partly in block form, illustrating an apparatus constructed in accordance with the features of one embodiment of the invention.
Figure 4:
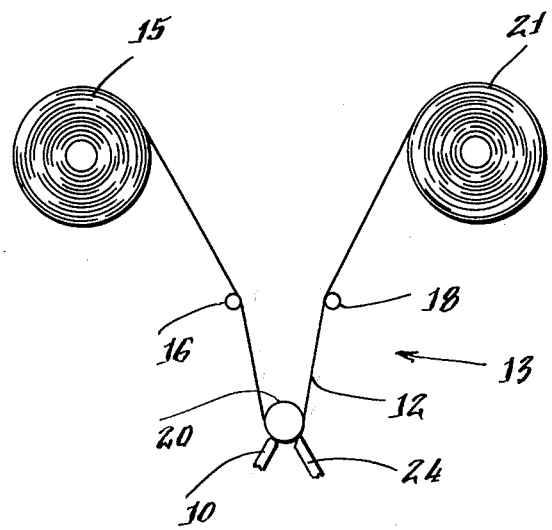
FIG. 4 is a schematic diagram illustrating a magnetic tape storage transport means utilized with the arrangement of FIG. 1.

Referring now to FIGS. 1 and 4, a digital data storage system is shown to include a recording head 10 for recording data on a magnetic medium comprising a magnetic tape 12, tape transport means 13 for establishing relative motion between the head 10 and the magnetic medium 12, and a circuit arrangement 14 for exciting the head in response to input data and in accordance with a predetermined code. While the storage medium is shown as a magnetic tape, it can alternatively comprise other forms of magnetic surface storage such as a magnetic disc or drum. The tape transport 13 (FIG. 4) includes a web of magnetic tape 12 wound on a supply reel 15. The tape is guided to the head 10 and is advanced past the head by tape guides 16 and 18 and a capstan 20. As tape is advanced past the record head 10 it is accumulated by a takeup reel 21. During data storage, the record head 10 is excited by a current flowing in a winding 22 (FIG. 1) and a relatively intense magnetic field is established at a gap 23 in the head. This field forms a residual flux pattern on the tape corresponding to the data being stored. In addition, and as desdribed in greater detail hereinafter, the tape transport arrangement also advances the tape 12 past a read head 24 for recovery of data stored on the tape.

Figure 5:
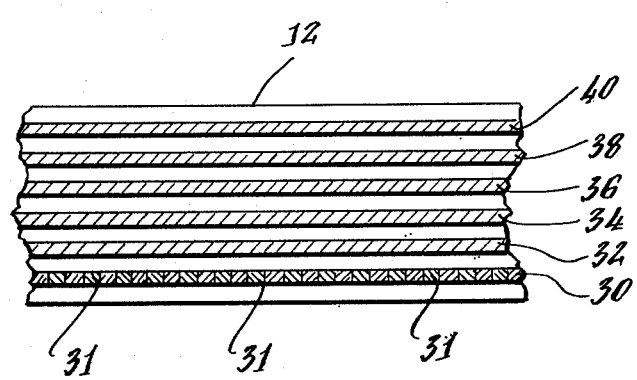
FIG. 5 is an enlarged, fragmentary plan view of a strip of magnetic data storage tape utilized with the tape transport of FIG. 4.

Data which is to be stored on the magnetic tape 12 is stored as a sequential residual magnetic flux pattern corresponding to an applied sequence of binary data bits. The residual flux pattern is formed on the magnetic tape 12 in an elongated track or channel 30 (FIG. 5) which extends in the direction of tape travel. Areas and tracks on the tape of FIG. 5 are cross hatched only for the purpose of illustrating relative positions of stored data. Bits of stored binary data extend along the track in a longitudinal array of substantially uniform surface areas or cells 31. The cells have a length which is determined by the speed of the tape past the head 10, the width of the gap 23 in the head, the profile of a pole tip of the head 10, the extent of fringe fields created when the head is excited, the encoding technique employed, and the duration of the exciting current in winding 22. A plurality of channels are provided in side by side relationship as illustrated by channels 32–40 and the head 10 is adapted to simultaneously store data in each of these channels. Similarly, the read head 24 is adapted to simultaneously recover data from each of these channels.

Encoding of binary data for storage and corresponding excitation of the head is provided by the circuit arrangement 14. A circuit means for exciting the head 10 and causing flux transitions to occur in response to control singals applied thereto comprises an amplifier and driver 42, a flip-flop circuit 44 and a WRITE signal combining OR gate 46. The amplifier and driver circuit 42 is coupled to the winding 22 and causes currents $i_1$ and $i_2$ to alternatively flow in opposite directions through the winding in response to level transitions on an output line 48 of the flip-flop 44. This flip-flop is arranged for toggle or counter operation and provides an output level change at line 48 upon each application of an input trigger signal thereto from the OR gate 46.

Figure 2:
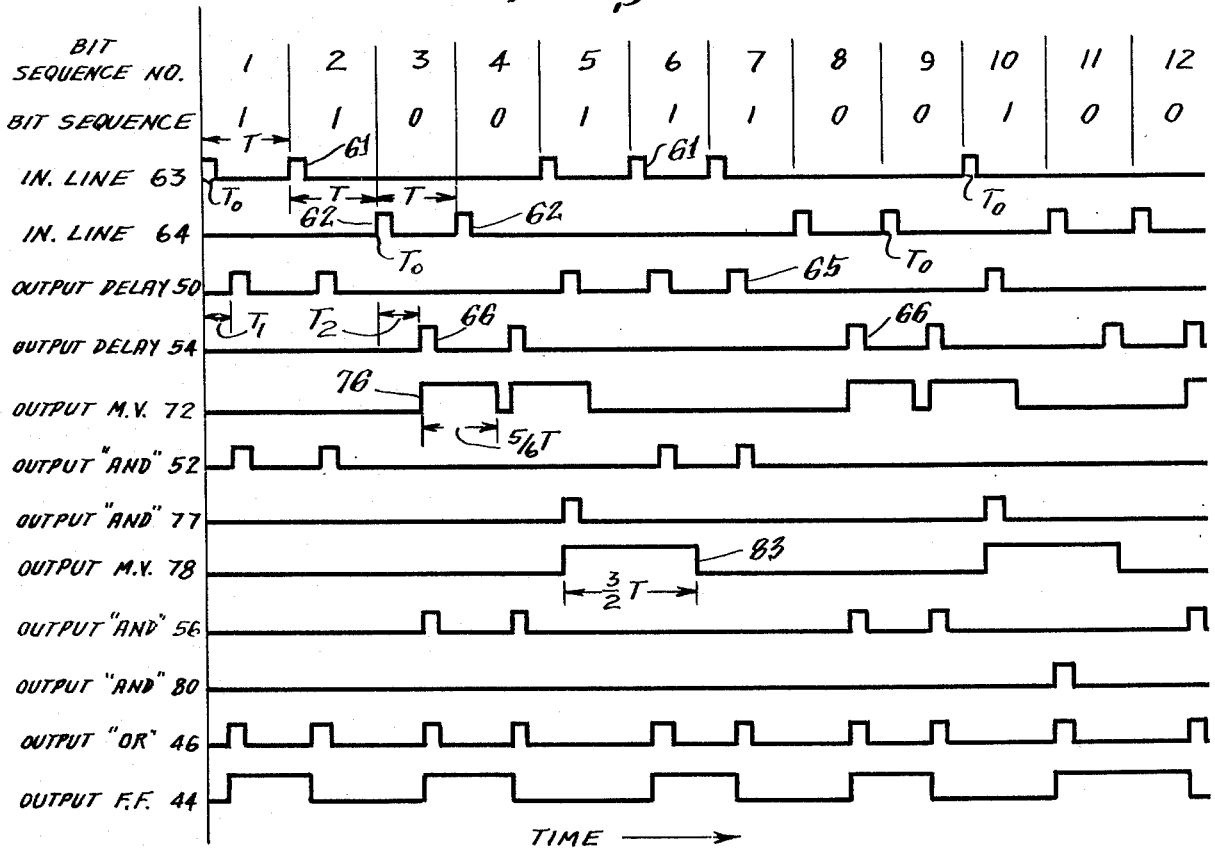
FIG. 2 is a diagram illustrating the signal wave-forms occurring at different locations in the circuit arrangement of FIG. 1.
Figure 3:
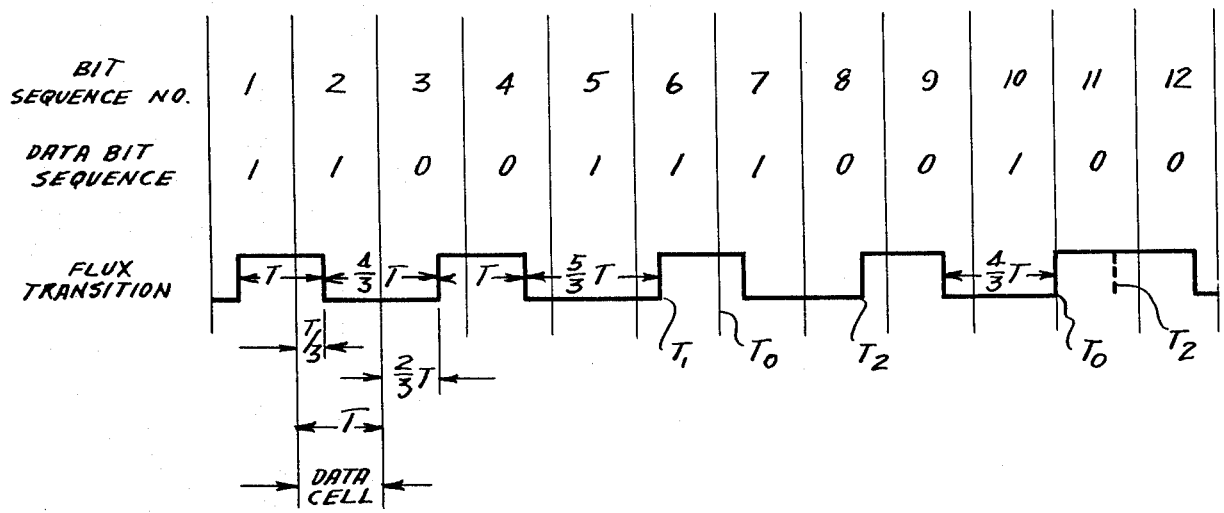
FIG. 3 is a diagram illustrating a sequence of data bits and the encoding format utilized for encoding the data bits.

An encoding circuit means which alternatively applies STORE 1, STORE 0, or STORE ADVANCED 0 signals to the OR gate 46 is provided. A STORE 1 signal is generated by a delay circuit 50 and an AND gate 52; a STORE 0 signal is generated by a delay circuit 54 and an AND gate 56; and, STORE ADVANCED 0 and INHIBIT STORE 1 and INHIBIT STORE 0 signals are generated by circuit means within the dashed rectangle 58. Data is supplied to the encoding circuit means from a source 60 which comprises, for example, a buffer register of a digital computer or other data source. The data is provided in a binary form as electrical pulses 61 (FIG. 2) representative of a first binary character 1 and as electrical pulses 62 representative of a second binary character 0. These pulses have a pulse width equal to or less than T/6. Pulses 61 are supplied on an input line 63 and pulses 62 are supplied on an input line 64. As illustrated in FIGS. 2 and 3, the rate at which these pulses are supplied provides a pulse repetition rate having a period or data pulse interval of T between the leading edge of immediately successive pulses. Each of these data pulses occurs at the initiation of the interval, $T_0$.

Binary data is encoded as illustrated in FIG. 3 by causing a transition in the magnetic flux of a storage cell to occur during the data pulse interval at a first predetermined time $T_1$ in order to store a bit representative of binary 1 or, alternatively for causing a transition at a second predetermined time $T_2$ during the interval in order to store a bit representative of the second binary character 0. This storage is accomplished more particularly by the circuit arrangement of FIG. 1 by establishing the time $T_1$ and $T_2$ at substantially ⅓ T and ⅔ T respectively after initiation $T_0$ of the data pulse interval. In the exemplary data pulse sequence of FIG. 3 this encoding is illustrated for a first binary character comprising binary 1, by flux transitions occurring at time $T_1$ during bit sequence numbers 1, 2, 6 and 7 and for a second binary character comprising binary 0 by transitions at time $T_2$ during bit sequence numbers 3, 4, 8, 9 and 12.

Successive transitions are separated by an interval of time at least equal to T in order to inhibit stored bit overlap and to assure adequate separation for detection during recovery of stored data. As illustrated in FIG. 3, 1–1 and 0–0 sequences are separated by an interval of time, T. A 0–1 sequence could undesirably result in a separation of 2T/3. However, a desired minimum separation of T is maintained for this data sequence by inhibiting head excitation during the occurrence of binary 1 at the time $T_1$ immediately following a transition for a binary 0 in which case a spacing of 4/3 T or 5/3 T is provided. This is illustrated by sequences 4 and 5 in FIG. 3. As described hereinafter, data recovery means sense this inhibited binary 1 and detect the occurrence of a 0–1 sequence. The sequence 1–0 is separated by an intermediate interval of 4/3 T.

The code also provides for maintaining a maximum transition time of $T_{max} = 5/3$ T. A data sequence 0-1-0 could undesirably result in a maximum transition time of 2T. The maximum transition separation time for the 0-1-0 sequence, however, is reduced, as illustrated by the data bit sequence 9, 10 and 11 of FIG. 3, by shifting the transition time of the last bit in the sequence. The transition time is advanced from its code time $T_2$ to coincidence with occurrence of the initiation of a data pulse interval. This condition is also sensed and interpreted by the data recovery means as a 0-1-0 sequence.

Referring again to FIGS. 1 and 2, leading edges of the binary data pulses 61 and 62 are coincident with initiation $T_0$ of a data pulse interval. Excitation of the head 10 is delayed with respect to initiation of the interval when writing a binary 1 or 0. The delay in writing binary 1 is established by the delay circuit means 50. In one embodiment of the invention, the delay time provided by circuit 50 is equal to T/3 and the head 10 is excited at a time $T_1$ which occurs T/3 after initiation of the interval. This is illustrated in FIG. 2 by the delayed pulses 65 which are provided at the output of delay circuit 50.

In a similar manner, a binary 0 pulse on line 64 is coupled through a delay circuit 54 for providing a delayed excitation of the head 10. The delay circuit 54 provides a time delay of ⅔ T thereby providing for switching of the toggle flip-flop 44 and causing a flux transition at a time $T_2$ which is ⅔ T subsequent to initiation of the interval. Delayed binary 0 pulses 66 are illustrated in FIG. 2.

As indicated hereinbefore, encoding of the binary data provides for a minimum separation time $T_{min}$ equal to T. Since a data sequence 0-1 (FIG. 3) could result in a $T_{min}$ of ⅔ T, the circuit means 58 is provided for inhibiting a flux transition at time $T_1$ immediately following a transition at time $T_2$ in a preceding interval. In FIG. 1, an output from AND gate 56 at time $T_2$ will initiate the excitation of the head 10. An output from this AND gate is also coupled to a delay circuit 72 for generating a signal which inhibits a transition at a succeeding time $T_1$. The delay circuit 72 comprises a one shot multivibrator which is timed to provide an inhibiting output at a succeeding time $T_1$. For a data pulse having a pulse output of T/6 the multivibrator should provide an output signal 76 (FIG. 2) having a duration of 5/6 T. The signal 76 is applied through an inverter circuit 74 to the AND gate 52 and, since it overlaps time $T_1$ in a succeeding interval, it inhibits an output from the AND gate 52 at this time. This can be seen in FIG. 2 with respect to the binary 1 pulses of bit sequence members 4–5 and 9–10.

The maximum transition separation time $T_{max}$, and accordingly, the bandwidth of the system is reduced by circuit means which advance the occurrence of the flux transition for the last bit in a sequence 0-1-0. Referring again to FIG. 1, there is provided an AND gate 77 having enabling inputs from the multivibrator 72 and from the delay circuit 50. An output from the AND gate 77 is a logical indication that a 0–1 sequence has occurred and that storage of 1 bit in this sequence has been inhibited. A pulse output from this AND gate is coupled to a one shot multivibrator 78 which generates a signal for both enabling an AND gate 80 and for inhibiting the AND gate 56 through an inverter 82. The multivibrator 78 provides a signal 83 (FIG. 2) having a pulse width of 3/2 T. This pulse extends in time from $T_1$ in one interval through time $T_2$ in a successive interval. The gate 80 which is enabled upon coincidence between this pulse and by an undelayed 0 pulse on line 64 provides an output which is coupled to the OR gate 46 for triggering flip-flop 44. An output from gate 80 thus represents a STORE 0 signal which is advanced from the encoded time $T_2$ in the interval to time $T_0$ at initiation of the interval. Since the pulsewidth of the multivibrator 78 extends through time $T_2$ in the interval, the AND gate 56 is inhibited at time $T_2$ and only a single transition occurs at the initiation $T_0$ of this interval. The head 10 is thus excited at initiation of an interval which succeeds a prior interval during which the storage of a binary 1 was inhibited.

A circuit arrangement for recovering binary data thus encoded and stored is illustrated in FIG. 6. This arrangement comprises circuit means for providing a stream of data pulses which are timed in coincidence with flux transitions on the magnetic medium, a circuit means for generating clock pulses which are synchronized with the stream of data pulses, and circuit means for decoding the data stream to provide binary data. The waveforms of signals occurring in the circuit of FIG. 6 are illustrated in FIG. 7. A stream of data pulses is provided by establishing relative motion between the flux patterns stored on the tape 12 and the red head 24. This relative motion results in the generation of a voltage in a winding 90 (FIG. 6) of the read head. The generated head voltage, not illustrated, comprises a sequence of positive and negative pulses which correspond to positive and negative flux transitions 89 (FIG. 7). This voltage is applied to a preamplifier, differentiator, and zero crossing detector 92 which amplifies and differentiates the generated voltage and provides an indication that the waveform of the read head voltage is at positive and negative maximums. An output of this detector is coupled to polarity sensitive detectors comprising a negative crossing detector 93 and a positive crossing detector 94, each of which provides positive output pulses, 95 and 96 respectively (FIG. 7), which are indicative of the occurrence of a transition. These pulses are coupled to an OR gate 98 which provides an output comprising a stream 99 of pulses timed in coincidence with flux transitions on the tape.

Timing of periodically recurring clock pulses 115 (FIG. 7) and of window pulses 119 (FIG. 7) which sample the data stream is provided by the stream 99 of data pulses. This stream is coupled to a toggle flip-flop 102 which enables oscillators 104 and 106 to alternatively generate relatively higher frequency output signals. Various forms of oscillator arrangements including phase locked and gated oscillators can be utilized. The oscillators illustrated are gated oscillators which are alternatively enabled and their output signals 105 and 107 (FIG. 7) are applied to an OR gate 108. An output of this OR gate comprises a continuous, periodic signal 109 which is synchronized with data being recovered. This signal is applied to and synchronizes the operation of a multivibrator 110. This multivibrator generates a waveform having a leading edge 113 which is employed for the timing of the clock and window pulses.

The gated oscillators 104 and 106 are each free running square-wave oscillators having a period of T/3 and are alternatively enabled by an output level from the flip-flop 102. With the data recovery arrangement of FIG. 6, timing of the clock and window pulses required that the oscillators 104 and 106 be gated on and off at such times as will cause the leading edge 113 of the output signal waveform of the multivibrator 110 (FIG. 7) to occur at a time T/6 before the time $T_1$ in an interval. As will be apparent from the discussion hereinafter, the clock pulses 115 will then be generated at time $T_2$ and the window pulses 119 for sampling the occurrence of data will be properly timed. Initial timing of the free running oscillators is accomplished, for example, through the use of a preamble of binary 1's which were recorded on the magnetic medium. The initialization of multivibrator 110 (FIG. 7), wherein the leading edge of the output occurs at the T/6 point in a bit interval, can be achieved by turning on a 5/6 T delay circuit at $T_1$ (normal occurrence of 1's) and then starting multivibrator 110 at the trailing edge (T/6 point).

A synchronized clock pulse 115 occurring at interval time $T_2$ is provided by utilizing a delayed output of multivibrator 110 for triggering a pulse generator. The multivibrator 110 generates an asymmetrical waveform having a positive going waveform component 111 extending for a period of time 5/6 T. The signal is applied through a delay circuit 112 to a pulse generator 114. Delay circuit 112 provides a ½ T delay in the application of this waveform to the pulse generator 114 as is illustrated in FIG. 7. The leading or positive going edge 113 of the delayed waveform triggers the pulse generator to provide an output clock pulse having a pulse width of T/6. These clock pulses occur at interval time $T_2$ and are applied to decoding circuit means 116 for binary data decoding and for timing of the occurrence of recovered binary 0's and 1's.

A circuit means for decoding the data stream 99 is shown in FIG. 6 within the dashed rectangle 116. As was described hereinbefore, a transition representative of a binary 0 can occur at the interval time $T_2$ as well as at a shifted time such as the interval time $T_0$ when an encoded binary 0 occurs after an inhibited binary 1. The system tolerance will allow for a shift of a transition of ± T/6. The occurrence of a binary 1 or a binary 0 in the data stream is determined by providing a detection window which extends over interval times $T_2$ and $T_0$ but excludes interval time $T_1$. The presence of a data pulse within this window is indicative of the occurrence of a binary 0 while the absence of a data pulse in the window interval is logically interpreted to be the occurrence of a binary 1. The window pulse 119 is provided by a pulse generator 120 which is triggered by the leading or positive going edge 113 of the output signal waveform of the delay multivibrator 110. Pulse generator 120 provides a negative window pulse component 119 having a pulse width ⅔ T and a positive output pulse component 121 (FIG. 7) having a pulsewidth of T/3. The generator 120 is triggered by the leading edge 113 at a time for centering the positive component 121 about the interval time $T_1$. The negative window component thus extends over internal times $T_2$ and $T_0$. An output of the pulse generator 120 is applied through an inverter 122 to an AND gate 123 along with data pulses from OR gate 98. The inverter 122 provides window pulses having the same polarity as the positive polarity of the data pulses. When coincidence between the window and data pulses occur, the AND gate 123 provides an output comprising a pulse 124 which is indicative of the occurrence of a binary 0. This output however can be asynchronous with the clock pulses 115 since it occurs alternatively at $T_2$ and $T_0$. Clocking is provided by employing these pulses to trigger a one shot multivibrator 126. This multivibrator provides a positive output waveform component 127 having a pulsewidth of about 5/6 T which extends from $T_2$ or $T_0$ to coincidence with the clock pulses 115 occurring at $T_2$. The output of multivibrator 126 is coupled to the AND gate 117 by line 128 and when coincidence occurs between this pulse and the clock pulse applied thereto, a clocked pulse 129 indicative of the occurrence of a binary 0 appears at the output terminal of the AND gate. Alternatively, the absence of an output at AND gate 123 indicates the occurrence of a binary 1. Output line 130 from the multivibrator 126 provides an inverse output which is applied to the AND gate 118. Coincidence between this inverse output with the clock pulses provides an output pulse 131 at AND gate 118 which is indicative of the presence of a binary 1.

An improved method and apparatus has thus been described which enhances the coding of digital data on a magnetic surface by providing data encoding having a minimum transition separation $T_{min}$ substantially equal to T and a maximum transition separation $T_{max}$ of 5/3 T. An enhanced system bandwidth is thereby provided along with improved self-clocking characteristics and a reduction of susceptibility to variations in the speed of the transported medium.

While I have described particular embodiments of my invention, it will be apparent to those skilled in the art that variations may be made thereto without departing from the spirit of the invention and the scope of the appended claims.

What is claimed is:

1. In a digital data storge system wherein bits of binary data to be stored are sequentially applied to the system at intervals of time T, said system including a magnetic recording head disposed adjacent a magnetic storage medium for sequentially storing said bits as residual magnetic flux on a longitudinally extending track of said medium, the improved method for storing said data comprising the steps of:
    establishing relative motion between said track and said recording head;
    exciting said recording head for causing a single transition in the magnetic state of a segment of said track to occur during an interval T, said excitation occurring during the interval at a first predetermined time $T_1$ for storing a bit representative of a first binary character or, alternatively, at a second predetermined time $T_2$ during the interval for storing a bit representative of a second binary character;
    inhibiting excitation of said head during an interval when the transition therein would be spaced less than T from a transition in an immediately adjacent interval for establishing a minimum separation $T_{min}$ equal to T between adjacent transitions; and
    shifting excitation of said head from a predetermined time to an alternate time in an interval which is immediately adjacent an interval in which excitation is inhibit so as to limit the maximum separation $T_{max}$ between adjacent transitions to a time less than 2T.

2. The method of claim 1 including the step of establishing said first predetermined time $T_1$ substantially at a time ⅓ T after initiation of the interval T and establishing said second predetermined time $T_2$ substantially at a time ⅔ T after the initiation of the interval T.

3. The method of claim 2 wherein excitation of said head is inhibited at a time $T_1$ in an interval immediately succeeding an interval in which said head was excited at time $T_2$.

4. The method of claim 3 including the step of exciting said recording head at a time $T_0$ corresponding to the initiation of an interval T which immediately succeeds a prior interval during which the excitation of the head was inhibited at said time $T_1$.

5. The digital data storage system of claim 4 wherein said magnetic surface storage medium comprises a magnetic tape, and relative motion is established between said head and said track by a tape transport means.

6. In a digital data storage apparatus for storing bits of binary data which are sequentially applied to the apparatus at intervals of time T, said apparatus including a magnetic recording head disposed adjacent a magnetic storage medium having a longitudinally extending track for sequentially storing said bits as residual magnetism on said track, the improvement comprising:
    means for establishing relative motion between said track and said recording head;
    means for exciting said recording head for causing a single transition in the magnetic state of a segment of said track adjacent the head to occur during a data pulse interval T at a first predetermined time $T_1$ during said interval for storing a first binary character or, alternatively, at a second predetermined time $T_2$ during said interval for storing a second binary character;
    means for inhibiting excitation of said head during an interval when the transition therein would be less than T from a transition in an immediately adjacent interval for establishing a minimum separation $T_{min}$ equal to T between adjacent transitions, and
    means for shifting excitation of said head from a predetermined time to an alternate time in an interval which is immediately adjacent an interval during which excitation of the head is inhibited so as to limit the maximum spacing $T_{max}$ between adjacent transitions to a time less than 2T.

7. The apparatus of claim 6 including means for causing said predetermined time $T_1$ to occur substantially at a time ⅓T after initiation $T_0$ of the interval T and said second predetermined time $T_2$ to occur substantially at a time ⅔ T after the initiation $T_0$ of the interval T.

8. The apparatus of claim 7 including means for inhibiting excitation of said recording head at said time $T_1$ in an interval immediately succeeding an interval in which the head was excited at said time $T_2$.

9. The apparatus of claim 8 including means for advancing excitation of said recording head from a time $T_2$ to a time $T_0$ in an interval which immediately succeeds an interval during which the excitation of the head was inhibited at said time $T_1$.

10. The apparatus of claim 9 wherein said recording head is positioned at said recording station, said storage medium comprises a web of magnetic tape, and means are provided for advancing the tape track in a longitudinal direction past said recording head.

11. The apparatus of claim 7 wherein said bits of binary data are applied as electrical pulses, said means for exciting said recording head includes a first circuit delay means providing a time delay to signals applied thereto of ⅓ T and a second circuit delay means for providing a time delay to signals applied thereto of ⅔ T, means for applying electrical signals representative of said first binary character to said first delay circuit and electrical signals representative of said second binary character to said second delay circuit, and means for applying output signals from said delay circuits to said recording head for exciting said head.

12. The apparatus of claim 11 wherein said means for applying output signals from said first and second delay circuit means to said recording head includes an inhibiting circuit means, and circuit means for detecting a separation in time between output signals of said first and second delay circuits of less than T and for applying a disabling signal to said inhibiting circuit means for inhibiting the application of an output signal from said first delay circuit to said recording head.

13. The apparatus of claim 12 including circuit means for detecting the occurrence of said disabling signal and for generating a first signal at time $T_0$ in a succeeding interval, coincidence circuit mens for generating a second signal at the occurrence of said first signal and a signal representative of said second binary character, means for coupling said coincidence circuit signal to said recording head for exciting said head, and circuit means for providing a disabling signal and for coupling said disabling signal to said inhibiting circuit means for inhibiting the application of the output of said second delay circuit to said head.

14. The apparatus of claim 6 including a read head adapted to generate output signals representative of a stored sequence of binary data when reltive motion is established between said head and said medium, circuit means coupled to said read head for generating a stream of signals representative of the binary data stored on said medium, circuit means for generating a window signal extending through time $T_2$ in one interval and time $T_0$ in an immediately succeeding interval and excluding time $T_1$ in succeeding interval, and first coincidence circuit means for providing an output signal when said window signal and a data signal occur in time coincidence.

15. Digital data recovery apparatus for recovering binary information recorded on a magnetic storage medium in respective recording segments each corresponding to a time interval T wherein a first binary digit is stored at a first predetermined time $T_1$ during an interval or alternatively a second binary digit is stored at a second predetermined time $T_2$ during the interval but an interval being absent a digit if the recording of a digit therein would have been spaced less than T from a digit in an adjacent interval, and the bit recorded in an interval adjacent an interval absent a digit being shifted so that it is spaced from adjacent digits an amount less than 2T, said recovery apparatus comprising:
    a read head;
    means for establishing relative motion between said read head and the storage medium;
    circuit means coupled to said read head for generating a stream of signals representative of the binary data stored on said medium;
    circuit means for generating a window signal extending through the time $T_2$ in one interval and the time $T_0$ in an immediately adjacent interval and excluding the time $T_1$ in said intervals; and,
    coincidence circuit means for providing an output signal when said window signal and a data signal occur in time coincidence.

16. The apparatus of claim 15 including means for generating clock pulses timed in synchronism with said stream of signals, and second coincidence circuit means for generating an output signal representative of the existence of a first binary character upon coincidence of a clock pulse and said first coincidence output signal.

17. The apparatus of claim 15 including third coincidence circuit means for generating an output signal representative of a second binary character upon the coincidence in time of said clock pulse signal and an inverse of said first coincidence circuit signal.

* * * * *